United States Patent
Yoshikawa et al.

(10) Patent No.: US 6,492,790 B2
(45) Date of Patent: Dec. 10, 2002

(54) DRIVING SYSTEM FOR DRIVING AC MOTOR

(75) Inventors: Toshifumi Yoshikawa, Hitachi (JP); Naoto Ohnuma, Hitachi (JP); Toshisuke Mine, Mito (JP); Takao Kishikawa, Hitachinaka (JP); Sadao Hokari, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/791,669

(22) Filed: Feb. 26, 2001

(65) Prior Publication Data

US 2002/0005704 A1 Jan. 17, 2002

(30) Foreign Application Priority Data

Jun. 20, 2000 (JP) ........................................ 2000-189715

(51) Int. Cl.[7] ................................................. H02P 1/24
(52) U.S. Cl. ........................ 318/727; 318/800; 318/801
(58) Field of Search ................................. 318/800, 727, 318/801; 363/37

(56) References Cited

U.S. PATENT DOCUMENTS 4,843,296 A * 6/1989 Tanaka ........................ 318/800

FOREIGN PATENT DOCUMENTS

JP 3-253293 11/1991

OTHER PUBLICATIONS

S. Ogasawara et al., "A Novel Control Scheme of a Parallel Current–Controlled PWM Inverter", *IEEE Transactions on Industry Applications*, vol. 28, No. 5, Sep./Oct. 1992, pp. 1023–1030.

T. Yoshikawa et al., "Analysis of Parallel Operation Methods of PWM Inverter Sets for an Ultra–High Speed Elevator", *Proceedings of the Fifteenth Annual IEEE Applied Power Electronics Conference and Exposition (APEC 2000)*, Feb. 6–10, 2000, Fairmont Hotel, New Orleans, Louisiana, vol. 1, 2000, pp. 944–950.

* cited by examiner

Primary Examiner—Karen Masih
(74) Attorney, Agent, or Firm—Antonelli, Terry, Stout & Kraus, LLP

(57) ABSTRACT

A driving system for driving an AC motor, which is capable of promptly switching to an individual inverter operation mode, wherein a control instruction for each of a plurality of power converters is generated by summing outputs of a plurality of current compensation units connected in parallel, and each of the plurality of current compensation units makes compensation to reduce a deviation of a detected output current value of an associated power converter from a current instruction value to be outputted from the power converter to zero.

9 Claims, 12 Drawing Sheets

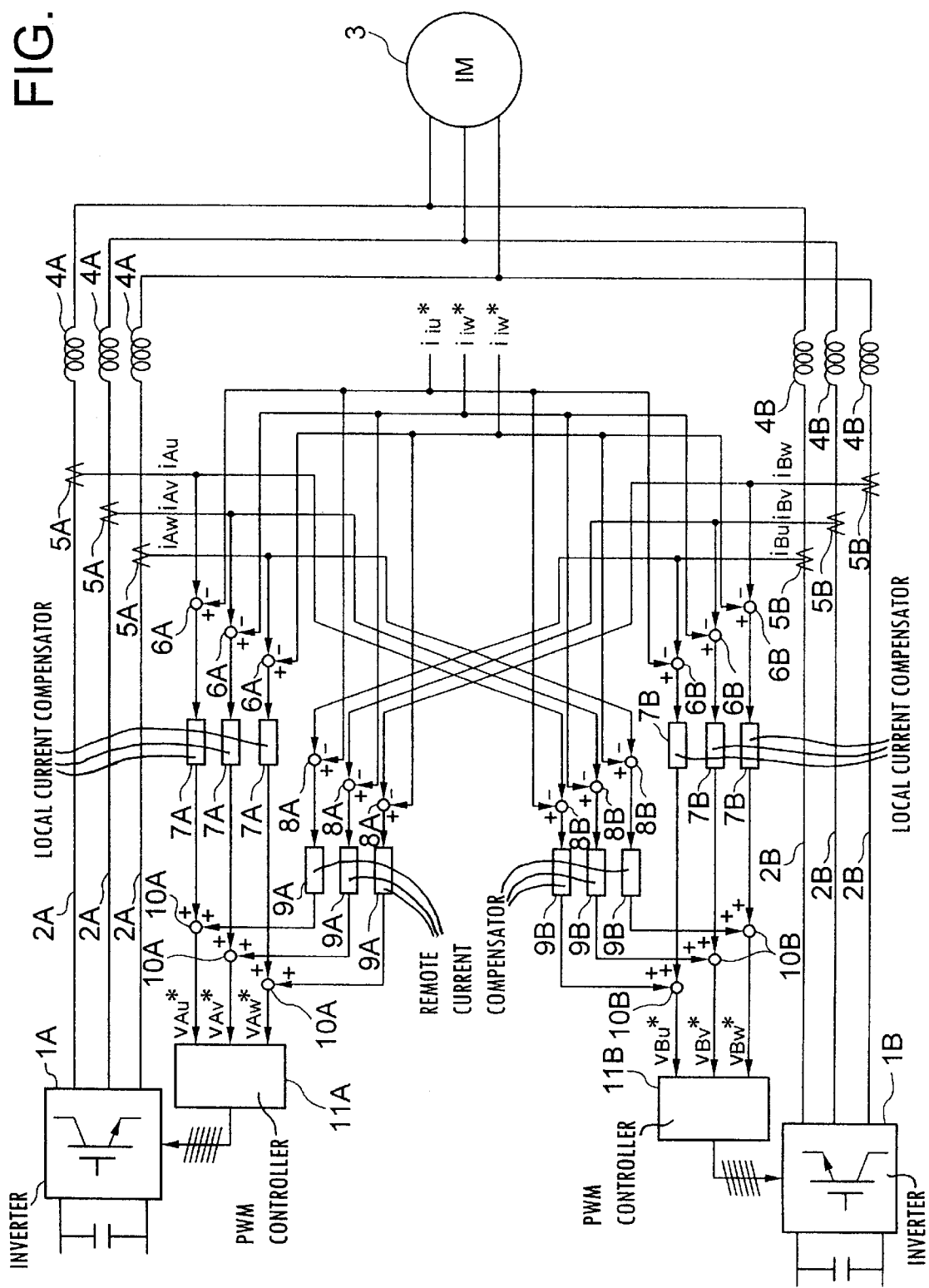

MOTOR CURRENT CIRCUIT

CROSS CURRENT CIRCUIT

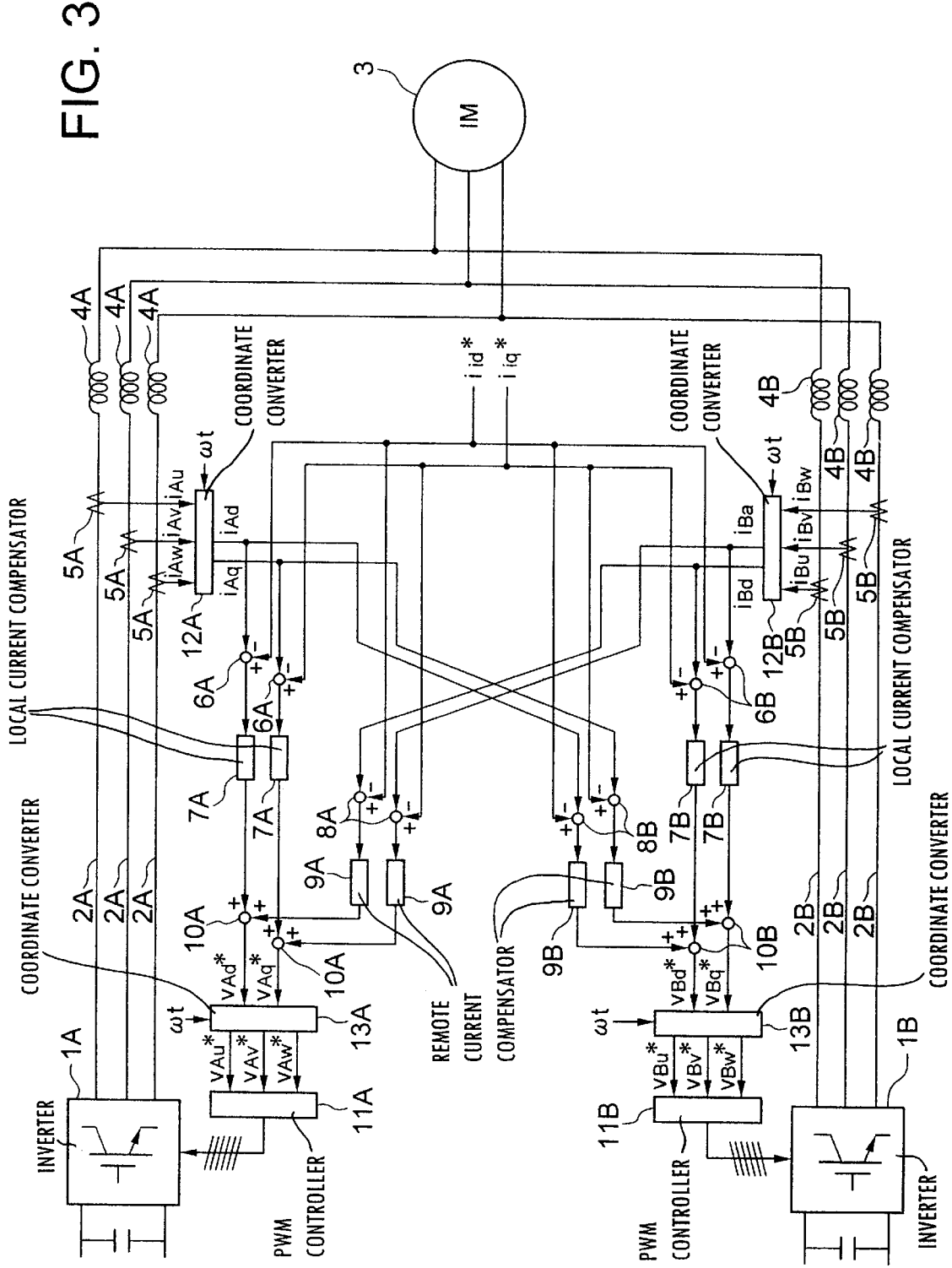

CONCEPT OF MOTOR CURRENT CIRCUIT
AND ASSOCIATED CONTROL BLOCK

CONCEPT OF CROSS CURRENT CIRCUIT
AND ASSOCIATED CONTROL BLOCK

DRIVING SYSTEM FOR DRIVING AC MOTOR

BACKGROUND OF THE INVENTION

The present invention relates to an AC motor driving system for driving a multi-phase AC motor using a plurality of inverters, and more particularly, to a controller for controlling the inverters.

Generally, a motor driving system is comprised of a power converter and a controller for controlling the power converter. For realizing a large capacity motor driving system, it is necessary to increase the capacity of the power converter. One method of realizing a large capacity motor drive involves driving a set of plural power converters in parallel and supplying the sum of output power of the respective converters to an AC motor.

For operating a set of converters in parallel, there are two alternative methods. In one method, each converter is connected to a motor through a reactor or an interphase reactor. In the other method, a multi-winding motor is used such that one converter is connected to a set of windings of the multi-winding motor. The respective converters are electrically coupled in the former case, and magnetically coupled in the latter case. Due to the existence of such coupling, an unwanted circular current flows between the converters through this coupling if a voltage difference is caused by variations in switching characteristics (for example, a turn-off characteristic) of switching elements which form parts of the respective converters. This circular current is also called "inter-inverter cross current" or simply "cross current." In the following description, the designation "cross current" will only be used.

A control method for effectively suppressing the cross current is described, for example, in JP-A-3-253293. The described method controls a current adjuster for controlling output currents of power converters such that a control gain for the sum of output currents of the respective power converters is able to differ from a control gain for an unbalanced current of each converter, i.e., a cross current. In this way, a control response to the cross current can be set independently of a control response to the sum of the output currents of the respective converters. Advantageously, the cross current can be suppressed with an appropriate control gain, and reactors with smaller inductance may be employed in consequence.

However, the characteristics and configuration of the control described in the foregoing prior art may be detailed as follows. [1] When the control gain for the sum of output currents is completely independent of the control gain for the cross current, the control configuration is complicated. [2] When there is a certain restriction between the control gain for the sum of output currents and the control gain for the cross current (for example, the latter can take only one half of the former), the control configuration is simplified.

Stated another way, with the control configuration described in the prior art, when an attempt is made to set the control gain for the sum of output currents independently of the control gain for the cross current, the control configuration inevitably becomes complicated. Therefore, if a microcomputer or a digital processor is used to execute the control, a longer time will be required for the processing. This results in a larger time delay and a reduction in stability margin, thereby giving rise to a problem in that the control gain cannot be increased and control response characteristics and disturbance suppression characteristics of the control system are degraded. Taking a motor driving system for an elevator as an example, a degraded disturbance suppression characteristic would cause increased high harmonic components in an inverter output current which act as torque ripple of a motor and bring about vibrations while the elevator is running.

Further, as another problem encountered when the control gain for the sum of output currents is set independently of the control gain for the cross current, the prior art control configuration suffers from difficulties in promptly switching to an individual inverter operation mode due to the complicated control configuration. For example, when one of two inverters operated in parallel fails, it is necessary to promptly switch the motor driving system to a mode in which the failed inverter is stopped, and the operation is continued with the remaining inverter. However, since the complicated control configuration described in the prior art results in a long time required for changing to the individual inverter operation mode, even the normal inverter is likely to end up in a failure due to an overcurrent or the like. In other words, the prior art control configuration is disadvantageous in that it is susceptible to a failure which has occurred in the system.

However, if the control configuration is simplified in order to avoid the two problems, a restriction imposed to the control gain for the sum of output currents and the control gain for the cross current would give rise to grave problems in that smaller reactors cannot be employed, the maximum output is reduced, and the power factor and efficiency are degraded.

SUMMARY OF THE INVENTION

It is an object of the present invention to provide a motor driving system in a simple control configuration which is based on the control principles that allow a control gain for the sum of output currents to be set independently of a control gain for a cross current. It should be noted that the sum of output currents is equal to a motor current, so that an expression "a control gain for a motor current can be set independently of a control gain for a cross current" is used in the following description.

To achieve the above object, in a control processing system for deriving a control instruction for each of a plurality of power converters, the control processing system comprises a plurality of current compensation units connected in parallel. Each of the plurality of current compensation units makes compensation to reduce a deviation of detected output current values of the plurality of current converters from current instruction values to be outputted from the power converters to zero. Also, a control instruction is generated for the power converter by summing outputs of the parallel current compensation units associated therewith.

With the configuration of the control processing system as described above, a control for motor currents can be performed independently of a control for cross currents in principle provided that compensation gains of the current compensation units satisfy certain conditions. Further, because of a simple control configuration, even when the control is implemented by a microcomputer or a digital processor, the processing will not take a long time, so that a control gain can be increased. Also, by stopping some of the plurality of parallel current compensation units, a prompt switching to an individual inverter operation mode can be achieved.

According to the present invention, when a plurality of inverters are operated in sets in parallel configuration to drive one motor, a control processing system associated with each of the inverters is comprised of a plurality of parallel current compensators divided into local compensators and remote compensators. With this configuration, it is possible to independently carry out suppression of cross currents flowing between the inverters through electric coupling or magnetic coupling and appropriate control for motor currents. Additionally, since the control configuration is simple as compared with the prior art control configuration having similar effects, assuming that the control processing systems are implemented by a microcomputer or a digital processor, a processing time can be reduced, i.e., a time delay is reduced, thus leading to a larger stability margin of the control system, and a higher compensation gains of the compensators, as compared with the prior art. This results in improved instruction response characteristics and disturbance suppression characteristics of the control system, and further suppression of torque ripple occurring in the motor.

BRIEF DESCRIPTION OF THE DRAWINGS

FIG. 1 is a diagram illustrating the configuration of a motor driver according to a first embodiment of the present invention;

FIG. 3 is a diagram illustrating the configuration of a motor driver according to a second embodiment of the present invention;

DETAILED DESCRIPTION OF EMBODIMENTS

Figure 2A:
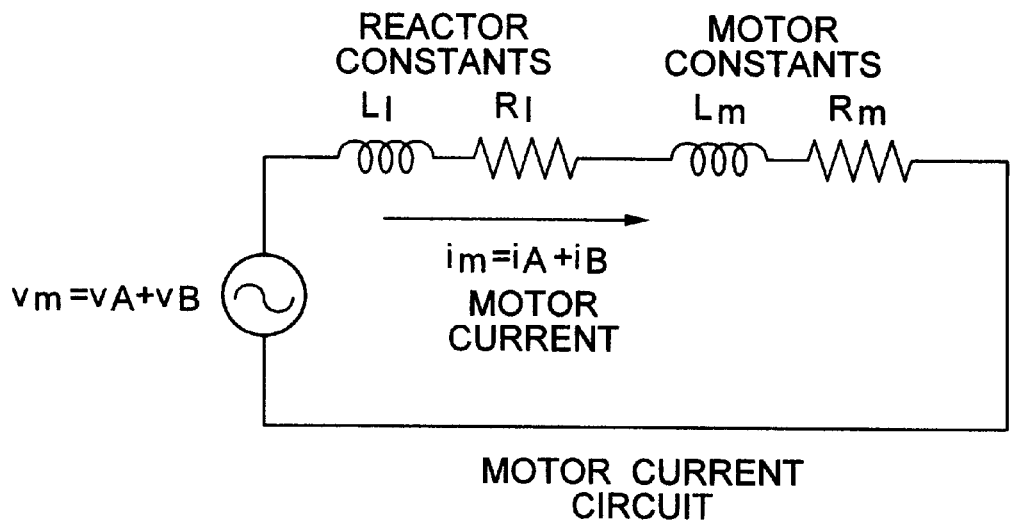
FIGS. 2A, 2B are equivalent circuits of an inverter set parallel operation system.

Embodiments of the present invention will hereinafter be described with reference to the accompanying drawings.

FIG. 1 is a diagram illustrating the configuration of an AC motor driver to which the present invention is applied. The motor driver comprises a set of inverters connected in parallel which is formed of a system for supplying power to an AC motor 3 from an inverter 1A through power lines 2A and reactors 4A, and a system for supplying power to the AC motor 3 from an inverter 1B through power lines 2B and reactors 4B. In the following, the system comprised of the inverter 1A, power lines 2A, reactors 4A and a control processing subsystem associated with control instructions to the inverter 1A is called the A-system, while the system comprised of the inverter 1B, power lines 2B, reactors 4B and a control processing subsystem associated with control instructions to the inverter 1B is called the B-system.

Each of the A-system inverter 1A and the B-system inverter 1B is constructed using a semiconductor switching device such as IGBT (Insulated Gate Bipolar Transistor) or GTO (Gate Turn Off thyristor) to output three-phase AC voltages based on control instructions from the A-system control processing subsystem or the B-system control processing subsystem, respectively.

The A-system control processing subsystem comprises two parallel current control sequences. One of the sequences is comprised of current sensors 5A for detecting output currents of the A-system inverter 1A; subtractors 6A each for taking a deviation of a current value detected by each of the current sensors 5A from a current indicated by an inverter current instruction; and A-system local current compensators 7A, each of which act to reduce the deviation to zero. The other sequence is comprised of current sensors 5B for detecting output currents of the B-system inverter 1B; subtractors 8A each for taking a deviation of a current value detected by each of the current sensors 5B from a current indicated by an inverter current instruction; and A-system remote current compensators 9A, each of which acts to reduce the deviation to zero. Respective outputs of the two parallel current control sequences are added by adders 10A, and the resulting sums serve as voltage instructions for the A-system inverter 1A. A PWM (Pulse Width Modulation) controller 11A converts the voltage instructions to a gate instruction which is outputted to the A-system inverter 1A. Each of the A-system local current compensators 7A and the A-system remote current compensators 9A may be implemented by a proportional-integral compensator or a proportional compensator.

The B-system control processing subsystem is configured symmetric to the A-system control processing subsystem. The B-system control processing subsystem also comprises two parallel current control sequences. One of the sequences is comprised of current sensors 5B for detecting output currents of the B-system inverter 1B; subtractors 6B each for taking a deviation of a current value detected by each of the current sensors 5B from a current indicated by an inverter current instruction; and B-system local current compensators 7B, each of which acts to reduce the deviation to zero. The other one is comprised of current sensors 5A for detecting output currents of the A-system inverter 1A; subtractors 8B each for taking a deviation a current value detected by each of the current sensor 5A from a current indicated by an inverter current instruction; and B-system remote current compensators 9B, each of which acts to reduce the deviation to zero. Respective outputs of the two parallel current control sequences are added by adders 10B, and the resulting sums serve as voltage instructions for the B-system inverter 1B. A PWM controller 11B converts the voltage instructions to a gate instruction which is outputted to the B-system inverter 1B. Each of the B-system local current compensators 7B and the B-system remote current compensators 9B may be implemented by a proportional-integral compensator or a proportional compensator.

In this embodiment, both the A-system control processing subsystem and the B-system control processing subsystem comprise two parallel current control sequences, i.e., a sequence associated with the local current compensators 7A or 7B, and a sequence associated with the remote current compensators 9A or 9B, and are characterized in that they can control motor currents and an inter-inverter cross currents independently of each other in a simple control configuration as compared with the prior art.

Next, the operation in the A-system and B-system control processing subsystems will be described.

Reference is first made to the operation in the A-system control processing subsystem. In the sequence associated with the local current compensators of the two parallel current control sequences in the A-system control processing subsystem, the subtractors 6A takes deviations of A-system currents $i_{AU}$, $i_{AV}$, $i_{AW}$ detected by the current sensors 5A from current instructions $i_{iu}^*$, $i_{iv}^*$, $i_{iw}^*$ which should be outputted from the inverter 1A, and the A-system local current compensators 7A act to approach the deviations to zero. In other words, the A-system local current compensators 7A generate outputs which act such that the A-system currents $i_{AU}$, $i_{AV}$, $i_{AW}$ approach to the current instructions $i_{iu}^*$, $i_{iv}^*$, $i_{iw}^*$, respectively. On the other hand, in the sequence associated with the remote current compensators, the subtractors 6B take deviations of B-system currents $i_{BU}$, $i_{BV}$, $i_{BW}$ detected by the current sensors 5B from current instructions $i_{iu}^*$, $i_{iv}^*$, $i_{iw}^*$ which should be outputted from the inverter 1B, and the A-system remote current compensators 8A act to approach the deviations to zero. In other words, the A-system remote current compensators 8A generate outputs which act such that the B-system currents $i_{BU}$, $i_{BV}$, $i_{BW}$ approach to the current instructions $i_{iu}^*$, $i_{iv}^*$, $i_{iw}^*$, respectively. Therefore, voltage instructions $V_{AU}^*$, $V_{AV}^*$, $V_{AW}^*$ for the A-system inverter 1A, generated by adding the outputs of the A-system local current compensators 7A and the outputs of the B-system remote current compensators 8A, are adjusted in such a manner that the A-system inverter currents follow the current instructions, and simultaneously adjusted in such a manner that the B-system inverter currents also follow the current instructions. As a result, as later described in detail, voltage outputs of the A-system inverter are adjusted to independently control currents flowing into the AC motor 3 to desired values and cross currents between the A-system and B-system inverters to zero, respectively.

Since the operation in the B-system control processing subsystem is in a symmetric relationship with the operation in the A-system control processing subsystem, description thereon is omitted. Likewise, in the B-system control processing subsystem, the two parallel current control sequences act to adjust voltage instructions $v_{BU}^*$, $v_{BV}^*$, $v_{BW}^*$ for the B-system inverter 1B such that B-system inverter currents follow current instructions, and simultaneously the A-system inverter currents also follow current instructions.

As described above, the A-system control processing subsystem and the B-system control processing subsystem together attempt to control the local and remote currents to match the current instructions, respectively, with the result that the motor currents are controlled to predetermined values, and the inter-inverter cross currents can be suppressed to zero. Moreover, since these control capabilities can be set independently of each other, it is possible to reduce inductance valve in reactor constants.

Next, the basis on which the control as described can be accomplished will be described in greater detail with reference to equivalent circuits.

Figure 2B:
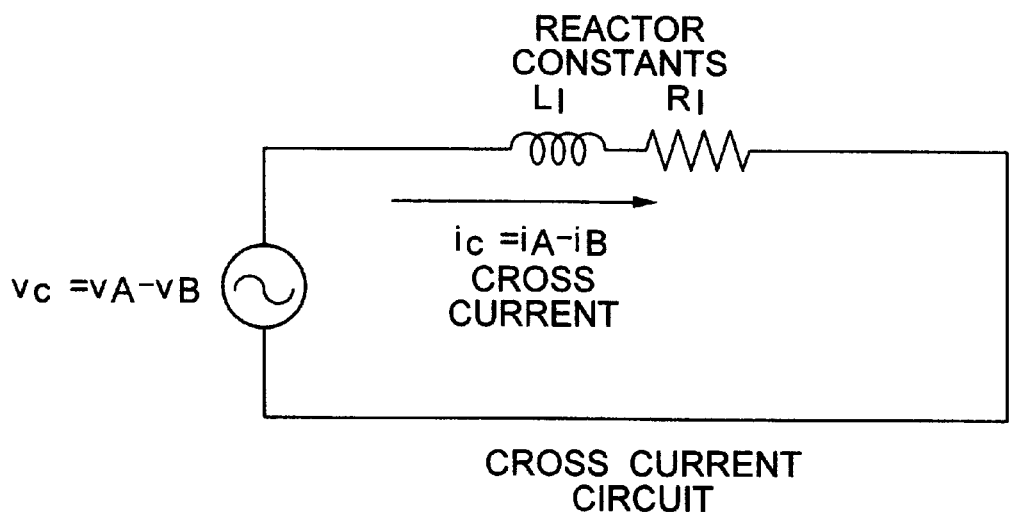

FIGS. 2A, 2B illustrate equivalent circuits of the inverter set parallel operation system as illustrated in FIG. 1. For simplifying the illustration, the equivalent circuits illustrate single-phase circuits. The equivalent circuits include two circuits, i.e., an independent motor current circuit (FIG. 2A) and a cross current circuit (FIG. 2B).

The motor current circuit represents a circuit for supplying a current to a motor. This motor current circuit uses the sum $v_m$ of an output voltage $v_A$ of the A-system inverter 1A and an output voltage $v_B$ of the B-system inverter 1B ($v_m = v_A + v_B$) as a voltage source, and supplies a current to a reactor circuit element and a motor circuit element. The current is the sum $i_m$ of an output current $i_A$ of the A-system inverter 1A and an output current $i_B$ of the B-system inverter 1B ($i_m = i_A + i_B$).

The cross current circuit represents a circuit associated with a cross current which does not flow into the motor but flows between the inverters. The illustrated cross current circuit uses a difference $v_C$ between the output voltage $v_A$ of the A-system inverter 1A and the output voltage $v_B$ of the B-system inverter 1B ($v_C = v_A - v_B$) as a voltage source, and supplies a current only through a reactor element. This current is a difference $i_C$ between the output current $i_A$ of the A-system inverter 1A and an output current $i_B$ of the B-system inverter 1B ($i_C = v_A - i_B$). It is this current $i_C$ which corresponds to the cross current. The voltage difference $v_C$ would not occur if the A-system and B-system inverters were constructed using ideal switches. Actually, however, switches used therefor exhibit variations in characteristics, so that the voltage difference $v_C$ occurs to cause the flow of the cross current $i_C$. It can be said that this is the mechanism of the generation of the cross current.

An ideal control method for an inverter set parallel operation system would involve controlling the motor current circuit and the cross current circuit on the equivalent circuits illustrated in FIGS. 2A, 2B independently of each other.

Figure 12A:
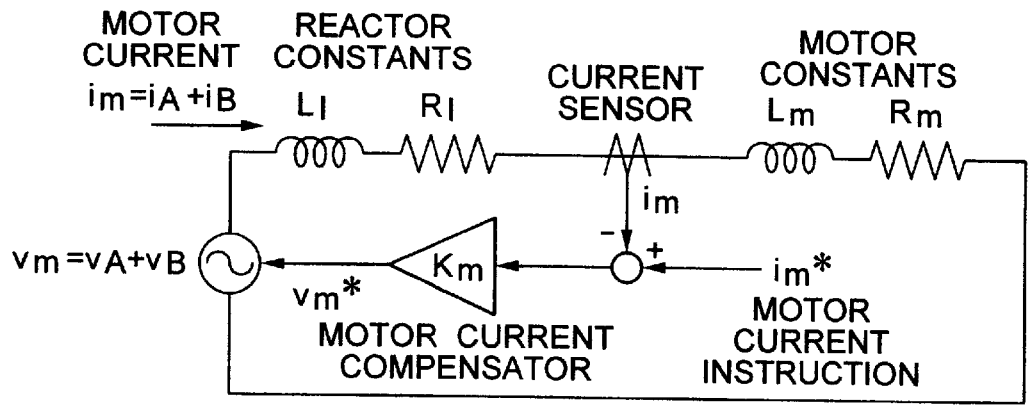
FIGS. 12A, 12B are conceptual diagrams illustrating an ideal control method on equivalent circuits of an inverter set parallel operation system.
Figure 12B:
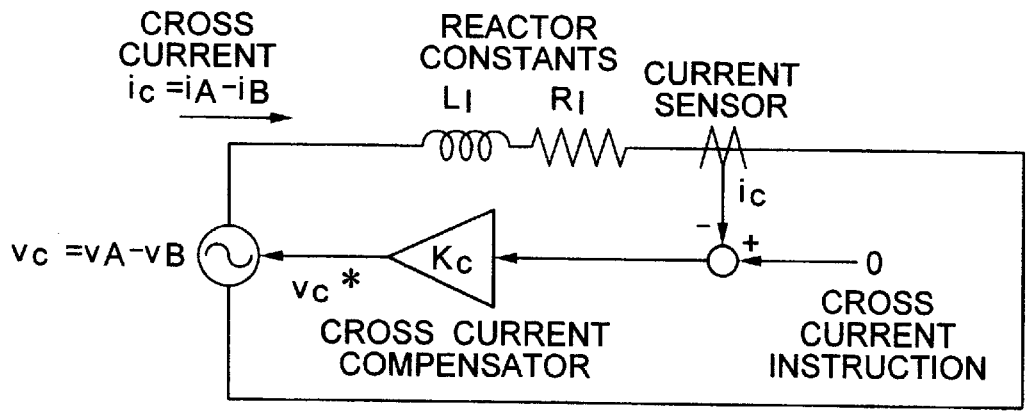

FIGS. 12A, 12B conceptually represent the ideal control method. The control of the motor current circuit is represented by a block for controlling the voltage $v_m$ to match the motor current $i_m$ with a motor current instruction $i_m^*$. The control of the cross current circuit is represented by a block for controlling the voltage $v_C$ to suppress the cross current $i_C$ to zero. In this configuration, a motor current compensator and a cross current compensator are each implemented as a proportional compensator, and are characterized in that they can set a proportional gain $K_m$ and a proportional gain $K_C$ to different values, respectively. In this way, even if inductance valve in reactor constants are set to an arbitrary value, appropriate proportional gains can be set in accordance with respective circuit constants for both control of the motor current circuit and control of the cross current circuit. It is therefore possible to simultaneously realize a reduction in the inductance valve in reactor constants, an appropriate control of the motor current, and suppression of the cross current.

Control equations for the motor current control sequence and the cross current control sequence in FIGS. 12A, 12B are expressed as follows:

$$v_m^* = K_m(i_m^* - i_m) \quad (1)$$

$$v_C^* = K_C(0 - i_C) \quad (2)$$

Here, from $v_m^* = v_A^* + v_B^*$, $v_C^* = v_A^* - v_B^*$, $i_m = i_A + i_B$, $i_m^* = i_A + i_B$, $i_C = i_A - B$, the equations (1), (2) can be transformed as follows:

$$v_A^* + v_B^* = K_m\{i_m^* - (i_A + i_B)\} \quad (3)$$

$$v_A{}^* - v_B{}^* = K_C\{0 - (i_A - i_B)\} \quad (4)$$

Next, the fact that the control processing subsystems in FIG. 1 satisfy the equations (3), (4), and conditions for that will be derived.

In the control processing subsystems in FIG. 1, a control equation for the A-system control processing subsystem is expressed as follows:

$$v_A{}^* = K_x(i_i{}^* - i_A) + K_y(i_i{}^* - i_B) \quad (5)$$

It should be noted herein that the control equation (5) is represented in a single-phase form, and proportional compensators are used for the A-system local current compensator 7A and the A-system remote current compensator 9A, where their proportional gains are represented by $K_x$, $K_y$, respectively.

On the other hand, a control equation for the B-system control processing subsystem is expressed as follows:

$$v_B{}^* = K_x(i_i{}^* - i_B) + K_y(i_i{}^* - i_A) \quad (6)$$

Likewise, the control equation (6) is represented in a single-phase form, and proportional compensators are used for the B-system local current compensator 7B and the B-system remote current compensator 9B, wherein their proportional gains are represented by $K_x$, $K_y$, respectively.

Now, the equations (5), (6) are transformed to derive the following equations (7), (8):

$$v_A{}^* + v_B{}^* = (K_x + K_y)\{2i_i{}^* - (i_A + i_B)\} \quad (7)$$

$$v_A{}^* - v_B{}^* = (K_x - K_y)\{0 - (i_A - i_B)\} \quad (8)$$

In order that the equations (7), (8) are equal to the equations (3), (4), the following conditions should be satisfied:

$$K_x + K_y = K_m \quad (9)$$

$$K_x - K_y = K_C \quad (10)$$

$$2i_i{}^* = i_m{}^* \quad (11)$$

The above equations are rewritten to express $K_x$, $K_y$, $i_i{}^*$ as follows:

$$K_x = \frac{K_m + K_c}{2} \quad (12)$$

$$K_y = \frac{K_m - K_c}{2} \quad (13)$$

$$i_i^* = \frac{i_m^*}{2} \quad (14)$$

In conclusion, when the compensation gain $K_X$ of the local current compensator, the compensation gain $K_y$ of the remote current compensator, and the inverter current instruction $i_i{}^*$ are set to satisfy the equations (9), (10), (11) or the equations (12), (13), (14) for the control processing subsystems illustrated in FIG. 1, the control equivalently illustrated in FIGS. 12A, 12B can be implemented. Thus, the control processing subsystems illustrated in FIG. 1, which satisfy the equations (9), (10), (11) or the equations (12), (13), (14), can realize the effects similar to the control represented in FIGS. 12A, 12B, i.e., the following three effects simultaneously: a reduction in the inductance valve in reactor constants, an appropriate control of the motor current, and suppression of the cross current.

Further, the control processing subsystems illustrated in FIG. 1 are simple in configuration as compared with a conventional control configuration which has similar effects. Therefore, assuming that the control processing subsystems are implemented by a microcomputer or a digital processor, a processing time can be reduced, thus leading to a reduction in a useless time delay, an increase in stability margin of the control system, and an increase in the compensation gains of the compensators, as compared with the prior art. This results in improved instruction response characteristics and disturbance suppression characteristics of the control system. In an AC motor driving system for an elevator, for example, torque ripple generated in a motor can be further suppressed to improve the riding quality of the elevator.

In addition, the control processing sub-systems in FIG. 1 can readily switch to an individual operation mode, when an inverter in one system fails, so that the remaining system only can be relied on to continue the operation. For example, assuming in FIG. 1 that the B-system inverter 1B fails, a gate stop instruction is outputted, for example, to the PWM controller 11B to stop the B-system inverter 1B, and simultaneously the output of the A-system remote current compensator 9A is stopped, whereby the system can readily transition to a mode in which the A-system inverter 1A is operated alone. Consequently, it is possible to promptly limit the influence due to the failed inverter in the one system and accordingly realize a system which is immune to a failure. Here, upon determining the occurrence of a failure in the B-system on the A-system side, for example, a gate stop instruction for the B-system inverter 1B may also be transmitted to the A-system as a B-system failure detection signal. Alternatively, the occurrence of a failure may be determined from the value of a detected current in the B-system inverter 1B used in the A-system. The former is advantageous in that a prompt failure determination can be made, while the latter is advantageous in that transmitter means are eliminated.

In summarizing the foregoing, the control processing subsystems of FIG. 1 which satisfy the equations (9), (10), (11) or the equations (12), (13), (14) provide the following effects. [1] By virtue of the reduction in the reactor constants, the appropriate control for the motor current, and the suppression of the cross current, smaller inductance valve in reactor constants and a suppressed cross current can be simultaneously accomplished, thereby providing such effects as an increased maximum output, an improved power factor and a higher efficiency. [2] A simple configuration of the control processing subsystems allows increased compensation gains of the compensators, and improved instruction response characteristics and disturbance suppression characteristics of the control system. [3] Since a switching to the individual operation mode can be readily carried out, it is possible to realize a system immune to a failure, which can promptly limit the influence resulting from a failure.

FIG. 3 illustrates a second embodiment of an AC motor driver to which the present invention is applied. In FIG. 3, the same reference numerals as those in FIG. 1 designate the same components. The configuration in FIG. 3 differs from the configuration in FIG. 1 in that the former additionally comprises a coordinate converter 12A for detected output current values of the A-system inverter 1A; a coordinate converter 12B for detected output current values of the B-system inverter 1B; a coordinate converter 13A for voltage instructions of the A-system inverter 1A; and a coordinate converter 13B for voltage instructions of the B-system inverter 1B.

The coordinate converter 12A converts detected output current values $i_{AU}$, $i_{AV}$, $i_{AW}$ of the A-system inverter 1A to an excited current component $i_{Ad}$ and a torque current component $i_{Aq}$ in a rotating magnetic field coordinate system. The operation performed by the coordinate converter 12A is expressed by the following equation (15):

$$\begin{bmatrix} i_{Bd} \\ i_{Bq} \end{bmatrix} = \sqrt{\frac{2}{3}} \begin{bmatrix} \cos\omega t & \sin\omega t \\ -\sin\omega t & \cos\omega t \end{bmatrix} \begin{bmatrix} 1 & -1/2 & -1/2 \\ 0 & \sqrt{3}/2 & -\sqrt{3}/2 \end{bmatrix} \begin{bmatrix} i_{Bu} \\ i_{Bv} \\ i_{Bw} \end{bmatrix} \quad (15)$$

where ω represents a primary angular frequency.

The coordinate converter 12B converts detected output current values $i_{BU}$, $i_{BV}$, $i_{BW}$ of the B-system inverter 1B to an excited current component $i_{Bd}$ and a torque current component $i_{Bq}$ in the rotating magnetic field coordinate system. The operation performed by the coordinate converter 12B is expressed by the following equation (16):

$$\begin{bmatrix} V^*_{Au} \\ V^*_{Av} \\ V^*_{Aw} \end{bmatrix} = \sqrt{\frac{2}{3}} \begin{bmatrix} 1 & 0 \\ -1/2 & \sqrt{3}/2 \\ -1/2 & -\sqrt{3}/2 \end{bmatrix} \begin{bmatrix} \cos\omega t & -\sin\omega t \\ \sin\omega t & \cos\omega t \end{bmatrix} \begin{bmatrix} V^*_{Ad} \\ V^*_{Aq} \end{bmatrix} \quad (16)$$

where ω represents a primary angular frequency.

The coordinate converter 13A converts output voltage instruction values $v_{Ad}^*$, $v_{Aq}^*$ of the A-system inverter 1A to three-phase AC voltage instructions $v_{AU}^*$, $v_{AV}^*$, $v_{AW}^*$. The operation performed by the coordinate converter 13A is expressed by the following equation (17):

$$\begin{bmatrix} i_{Ad} \\ i_{Aq} \end{bmatrix} = \sqrt{\frac{2}{3}} \begin{bmatrix} \cos\omega t & \sin\omega t \\ -\sin\omega t & \cos\omega t \end{bmatrix} \begin{bmatrix} 1 & -1/2 & -1/2 \\ 0 & \sqrt{3}/2 & -\sqrt{3}/2 \end{bmatrix} \begin{bmatrix} i_{Au} \\ i_{Av} \\ i_{Aw} \end{bmatrix} \quad (17)$$

where ω represents a primary angular frequency.

The coordinate converter 13B converts output voltage instruction values $v_{Bd}^*$, $v_{Bq}^*$ of the B-system inverter 1B to three-phase AC voltage instructions $v_{BU}^*$, $v_{BV}^*$, $v_{BW}^*$. The operation performed by the coordinate converter 13B is expressed by the following equation (18):

$$\begin{bmatrix} V^*_{Bu} \\ V^*_{Bv} \\ V^*_{Bw} \end{bmatrix} = \sqrt{\frac{2}{3}} \begin{bmatrix} 1 & 0 \\ -1/2 & \sqrt{3}/2 \\ -1/2 & -\sqrt{3}/2 \end{bmatrix} \begin{bmatrix} \cos\omega t & -\sin\omega t \\ \sin\omega t & \cos\omega t \end{bmatrix} \begin{bmatrix} V^*_{Bd} \\ V^*_{Bq} \end{bmatrix} \quad (18)$$

where ω represents a primary angular frequency.

In the configuration of FIG. 3, the coordinate converters 12A, 12B act to convert basic wave components of the inverter output currents to direct current signals. As a result, when a proportional-integral compensation is performed in the local current compensators 7A, 7B and the remote current compensators 9A, 9B, a gain for a deviation (converted to direct current components) is infinity, so that a steady-state deviation can be eliminated. Consequently, it is possible to realize a highly accurate control for each of the motor current and the cross current and improve the efficiency as the AC motor driver.

Figure 4:
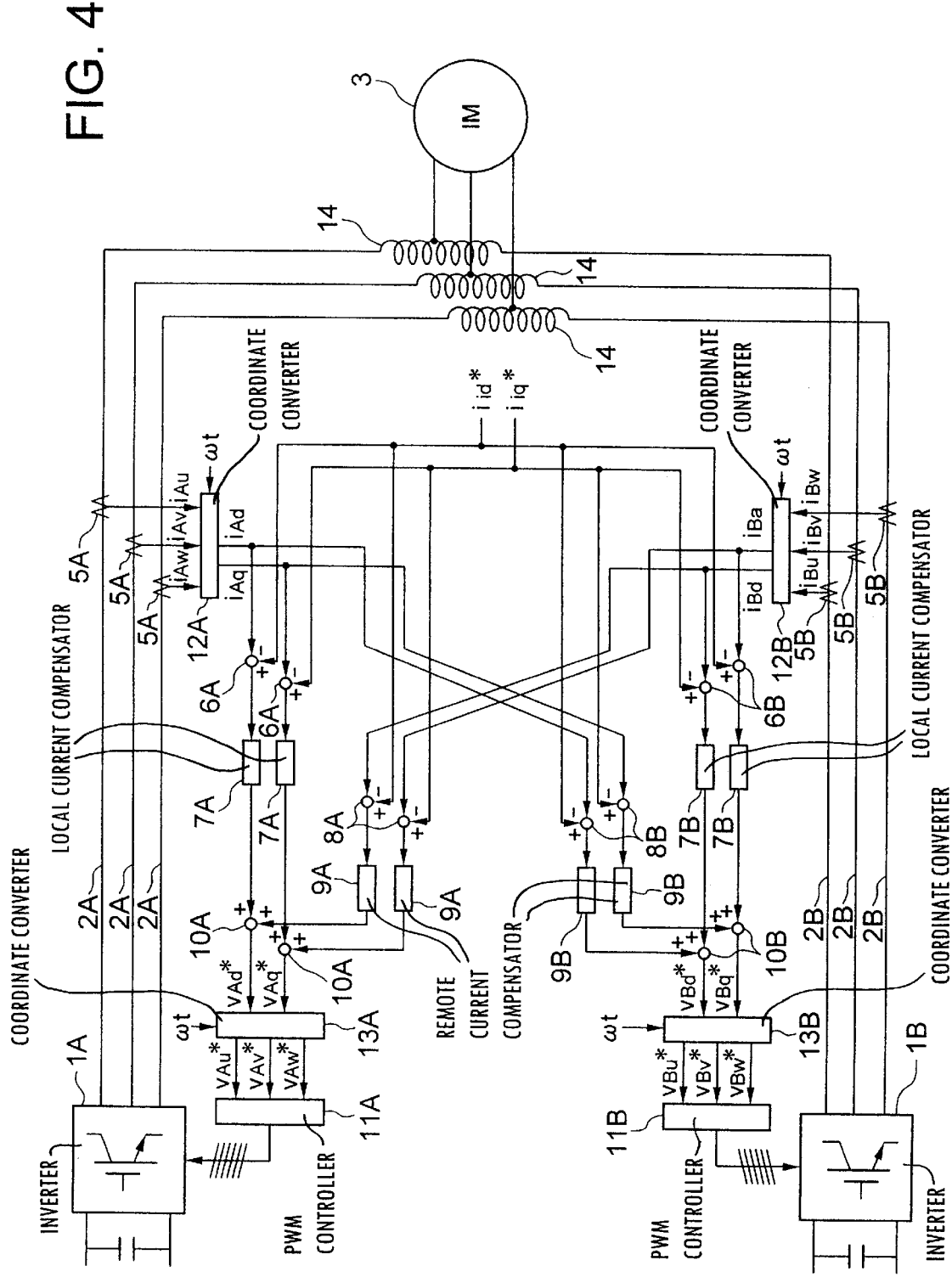
FIG. 4 is a diagram illustrating the configuration of a motor driver according to a third embodiment of the present invention.

FIG. 4 illustrates a third embodiment of an AC motor driver to which the present invention is applied. In FIG. 4, the same reference numerals as those in FIG. 3 designate the same components. The configuration in FIG. 4 differs from the configuration in FIG. 3 in that interphase reactors 14 are used in place of AC reactors 4A, 4B. When the interphase reactors are used, inverters are connected to both ends of the respective reactors, and power is supplied to a motor from center points of windings of the reactors, as can be seen in FIG. 4.

Discussing the action of the interphase reactors 14 on the equivalent circuits in FIGS. 2A, 2B, an inductance value in reactor constants of a motor current circuit is a leak inductance value which can be reduced to a sufficiently small value. An inductance value in reactor constants of a cross current circuit can be increased to a value twice that of an AC reactor. In other words, in FIGS. 2A, 2B, the interphase reactor 14 acts to reduce the inductance value L1 to 0 (L1→0) on the motor current circuit and to increase the inductance value L1 to 2L1 (L1→2L1) on the cross current circuit. As a result, the power factor can be improved in the motor current circuit, so that more active power can be supplied to the motor. In the cross current circuit, in turn, the inductance is increased so that the suppression of the cross current is facilitated. Further, the interphase reactor can be regarded apparently as an integration of six AC reactors into three, thereby providing an additional effect of reducing the size of the reactor.

As described above, in the fourth embodiment, the use of the interphase reactors effectively improves the power factor and reduces the size of the driver, in addition to the effects provided by the first and second embodiments.

Figure 5:
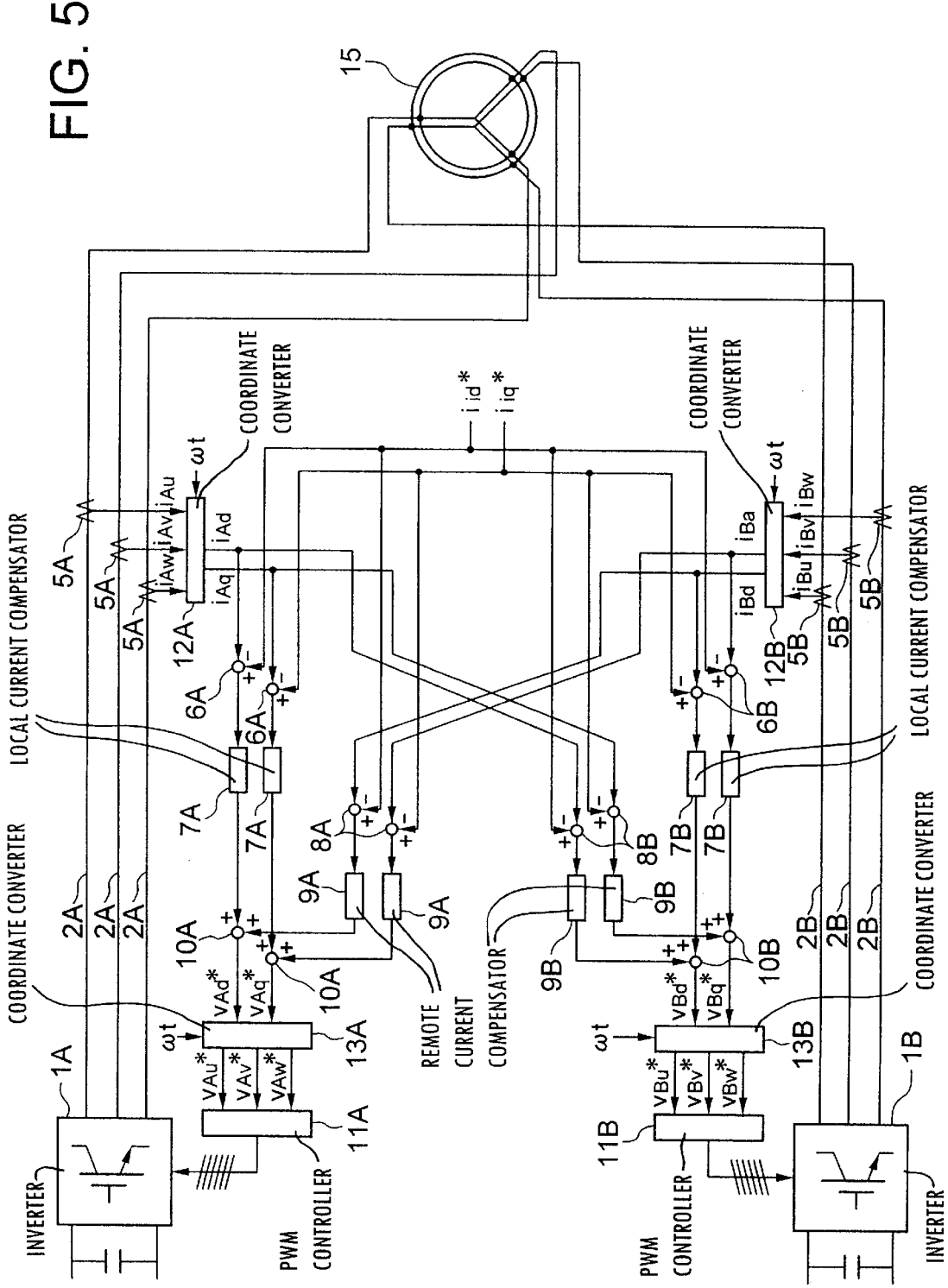
FIG. 5 is a diagram illustrating the configuration of a motor driver according to a fourth embodiment of the present invention.

FIG. 5 illustrates a fourth embodiment of an AC motor driver to which the present invention is applied. In FIG. 5, the same reference numerals as those in FIG. 3 designate the same components. The configuration in FIG. 5 differs from the configuration in FIG. 3 in that a three-phase two-winding motor 15 is substituted for the motor 3 in the aforementioned embodiments, and the reactors 4A, 4B are eliminated.

The three-phase two-winding motor 15 has stator windings of the motor composed of two sets of three-phase windings. In FIG. 5, one set of three-phase windings is powered by the A-system inverter 1A, while the other set of three-phase windings is powered by the B-system inverter 1B. Although the two sets of three-phase windings are electrically insulated, they are magnetically coupled through a stator core. The magnetic coupling between these windings can be represented equivalently by coupling through reactors. In other words, the configuration in FIG. 5 may be regarded as equivalent to the configuration in FIG. 3 in terms of the electric circuit. Therefore, when the three-phase two-winding motor is driven as in FIG. 5, the same effects as those described in FIG. 3 can be provided by applying the same control configuration as FIG. 3 to the three-phase two-winding motor. Additionally, in the configuration of FIG. 5, since the magnetic coupling between the stator windings can be applied as an action of reactors, a smaller driver without reactors can be provided.

Figure 6:
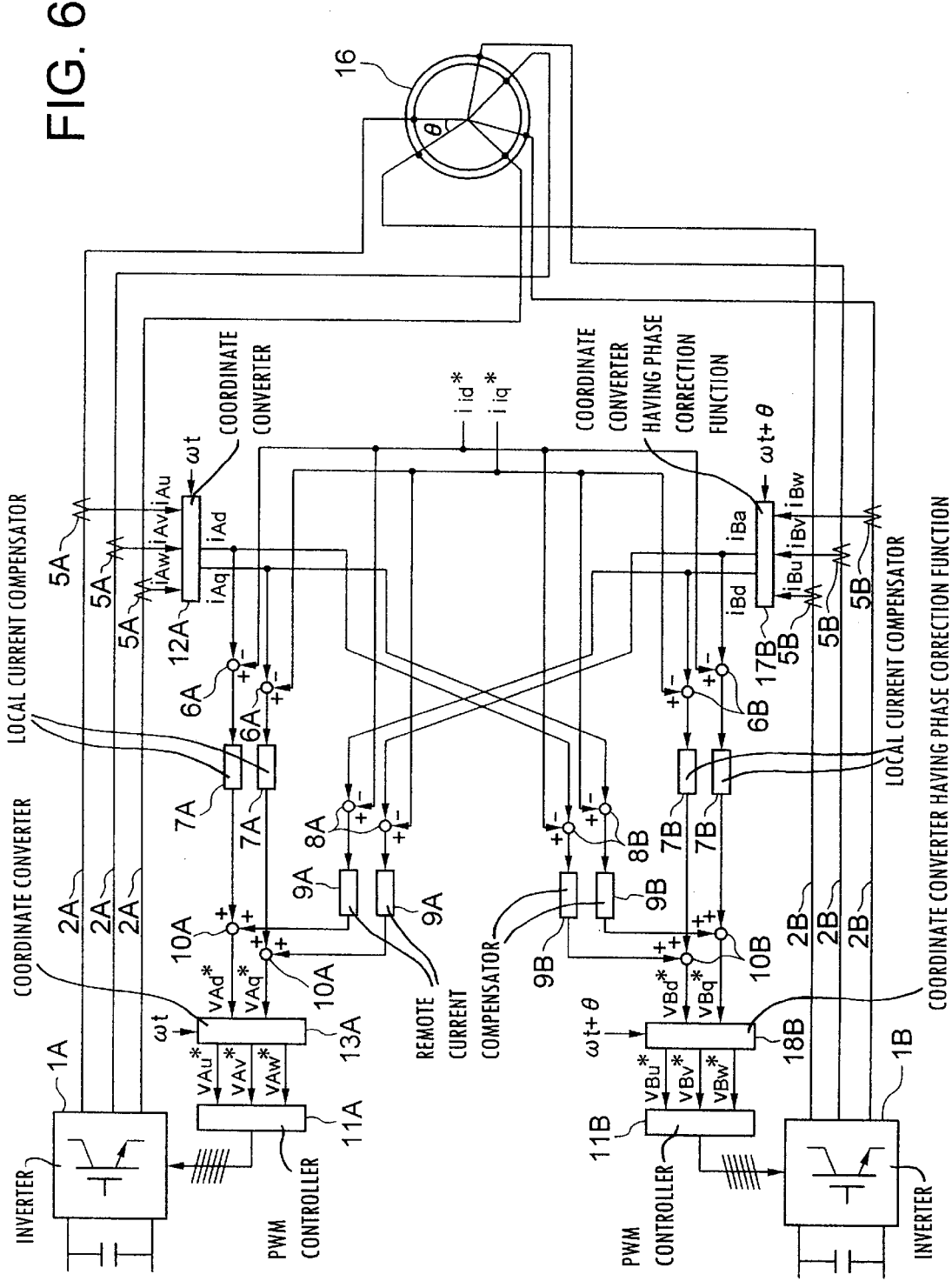
FIG. 6 is a diagram illustrating the configuration of a motor driver according to a fifth embodiment of the present invention.

FIG. 6 illustrates a fifth embodiment of an AC motor driver to which the present invention is applied. In FIG. 6, the same reference numerals as those in FIG. 5 designate the same components. The configuration in FIG. 6 differs from the configuration in FIG. 5 in that a three-phase two-winding motor 16 having windings wound with a phase difference θ is substituted for the motor 15, a coordinate converter 17B having a phase correction function is provided for detected output current values of the B-system inverter 1B, and a coordinate converter 18B having a phase correction function is provided for voltage instructions to the B-system inverter 1B.

When the three-phase two-winding motor 16 with the phase difference is employed, torque ripple of a certain order number (a basic wave is designated as the first-order) can be suppressed by means of the phase difference. For example, a three-phase two-winding motor with a winding phase difference set to 30° can suppress sixth-order torque ripple. Generally, an inverter has a tendency of increasing sixth-order torque ripple by the action of a dead time provided to prevent arm short-circuiting. Therefore, the problem of the increase in the sixth-order torque ripple inherent to the inverter can be solved if a three-phase two-winding motor with a phase difference of 30° is employed.

However, it should be noted herein that when the three-phase two-winding motor 16 with the phase difference is employed, output currents of each inverter should be delivered with a phase difference corresponding to the phase difference of the windings. For example, assuming in FIG. 6 that a set of windings connected to the B-system inverter 1B has a delayed phase difference θ with respect to a set of windings connected to the A-system inverter 1A, output currents $i_{AU}$, $i_{AV}$, $i_{AW}$ of the A-system inverter 1A have the phases delayed by θ from those of output currents $i_{BU}$, $i_{BV}$, $i_{BW}$ of the B-system inverter 1B, respectively. Therefore, the control processing subsystems must match the phases of detected output current values of the A-system inverter 1A with the phases of detected output current values of the B-system inverter 1B as well as delay the voltage instruction phases of the B-system inverter 1B by θ from the voltage instruction phases of the A-system inverter 1A.

The coordinate converter 17B having the phase correction function for the detected output current values of the B-system inverter 1B, and the coordinate converter 18B having the phase correction function for the voltage instructions to the B-system inverter 1B shown in FIG. 6 can serve to perform the foregoing operations, respectively. The coordinate converter 17B converts the detected output current values of the B-system inverter 1B to corresponding values in a rotating coordinate system with the phase advanced by θ. Here, the operation performed by the coordinate converter 17B is expressed by the following equation (19):

$$\begin{bmatrix} i_{Bd} \\ i_{Bq} \end{bmatrix} = \sqrt{\frac{2}{3}} \begin{bmatrix} \cos(\omega t - \theta) & \sin(\omega t - \theta) \\ -\sin(\omega t - \theta) & \cos(\omega t - \theta) \end{bmatrix} \begin{bmatrix} 1 & -1/2 & -1/2 \\ 0 & \sqrt{3}/2 & -\sqrt{3}/2 \end{bmatrix} \begin{bmatrix} i_{Bu} \\ i_{Bv} \\ i_{Bw} \end{bmatrix} \quad (19)$$

As a result, the detected output current values of the A-system inverter 1A are equal in phase to the detected output current values of the B-system inverter 1B, so that the outputs of the current compensators associated therewith can be added to the respective output current values in the adders 10A, 10B, respectively. The coordinate converter 18B in turn converts voltage instructions to the B-system inverter 1B to corresponding values in the three-phase AC system with the phase delayed by θ. In this event, the operation performed by the coordinate converter 18B is expressed by the following equation (20):

$$\begin{bmatrix} V^*_{Bu} \\ V^*_{Bv} \\ V^*_{Bw} \end{bmatrix} = \quad (20)$$

-continued $$\sqrt{\frac{2}{3}} \begin{bmatrix} 1 & 0 \\ -1/2 & \sqrt{3}/2 \\ -1/2 & -\sqrt{3}/2 \end{bmatrix} \begin{bmatrix} \cos(\omega t - \theta) & -\sin(\omega t - \theta) \\ \sin(\omega t - \theta) & \cos(\omega t - \theta) \end{bmatrix} \begin{bmatrix} V^*_{Bd} \\ V^*_{Bq} \end{bmatrix}$$

As a result, the voltage instruction phases of the B-system inverter 1B can be delayed by θ from the voltage instruction phases of the A-system inverter 1A, and therefore the output current phases of the A-system inverter 1A can be delayed by θ from the output current phases of the B-system inverter 1B.

As described above, in the fifth embodiment illustrated in FIG. 6, the actions of the coordinate converters 17B, 18B having the phase correction function allow the control processing described in the embodiment of FIG. 3 to be applied to an AC motor driving system which employs the three-phase two-winding motor 16 with a phase difference. As a result, in addition to the effects so far described above, the torque ripple can be further suppressed by the action of the three-phase two-winding motor with a phase difference. For example, when the embodiment of FIG. 6 is applied to a motor driver for an elevator, the suppression of the torque ripple results in elimination of vibrations, so that the riding quality of the elevator can be improved while it is running.

Figure 7:
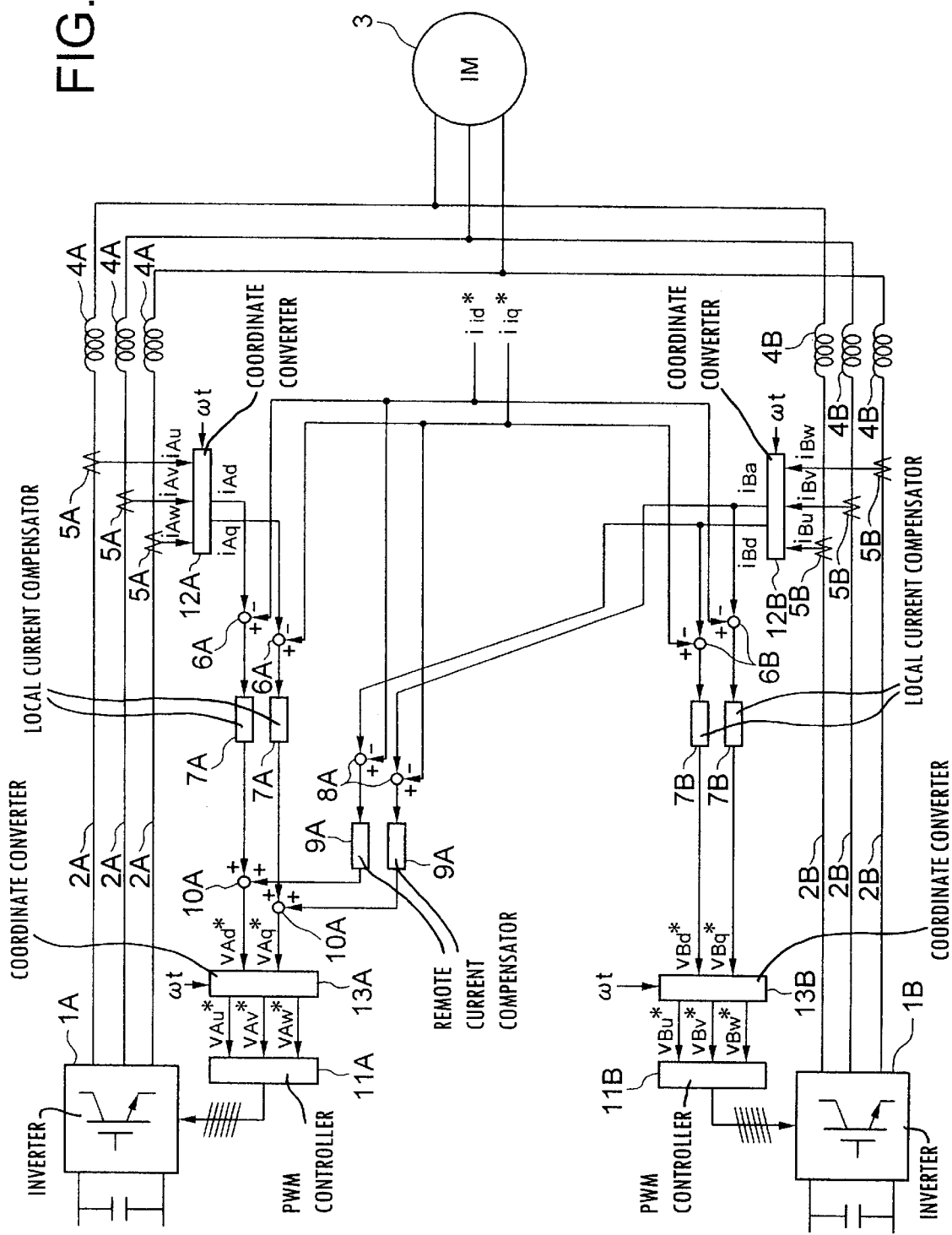
FIG. 7 is a diagram illustrating the configuration of a motor driver according to a sixth embodiment of the present invention.

FIG. 7 illustrates a sixth embodiment of an AC motor driver to which the present invention is applied. In FIG. 7, the same reference numerals as those in FIG. 3 designate the same components. The configuration in FIG. 7 differs from the configuration in FIG. 3 in that the control processing subsystem associated with the remote current compensators 9B, i.e., the subtractors 8B, remote current compensators 9B and adders 10B are removed in the control processing subsystem for the B-system inverter 1B.

In the control processing subsystems illustrated in FIG. 7, the control processing subsystem for the B-system inverter 1B controls output voltage instructions only with the outputs of the local current compensators 7B. On the other hand, the control processing subsystem for the A-system inverter 1A controls output voltage instructions with the sum of the outputs from the local current compensators 7A and the remote current compensators 9A. Therefore, the output voltages of the B-system inverter 1B take proper values such that the output currents of the inverter 1B match current instruction values, whereas the output voltages of the A-system inverter 1A are determined such that the output currents of both the A-system inverter and the B-system inverter match current instruction values. As a result, the output voltages of the A-system inverter 1A are adjusted in a direction in which cross currents between the inverters are suppressed, i.e., in a direction in which they are made coincident with output voltages of the B-system inverter 1B. It is desirable herein that the action of the remote current compensators 9A is determined such that the remote current compensators 9A have a smaller time constant than the local current compensators 7A, 7B. It should be noted that in the control processing subsystems illustrated in FIG. 7, the A-system is only affected by the B-system, while the B-system is independent in terms of the control, so that advantageously, no control interference occurs between the A-system and the B-system in principle.

As will be appreciated from the foregoing, under an operating condition in which no influence is exerted even if the suppression of cross currents are controlled with a small time constant, for example, under an operating condition with a long steady-state operating period, the application of the embodiment illustrated in FIG. 7 results in a simplified control processing configuration, and elimination of interference between the A-system control processing subsystem and the B-system control processing subsystem in principle.

Figure 8:
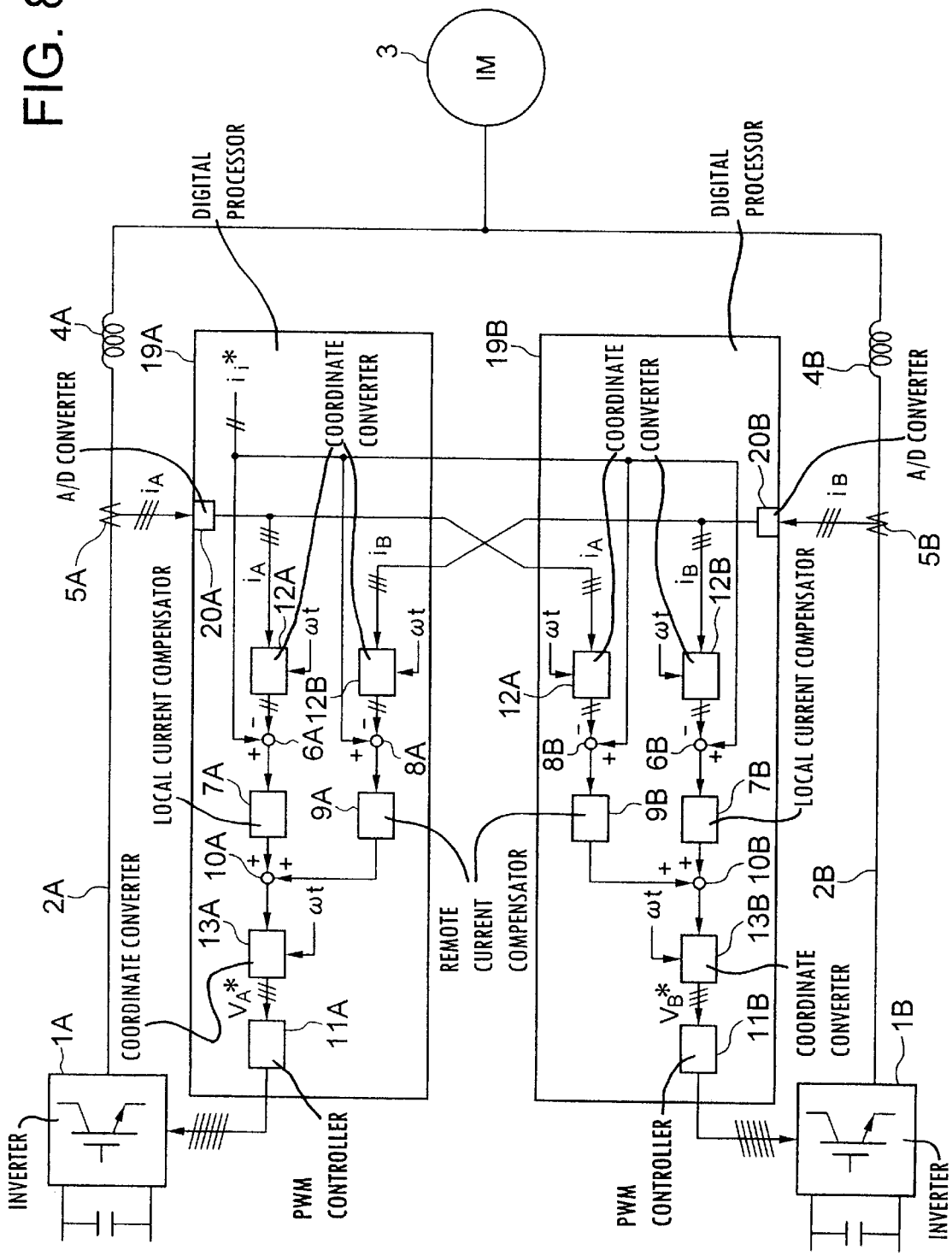
FIG. 8 is a diagram illustrating the configuration of a motor driver according to a seventh embodiment of the present invention.

FIG. 8 illustrates a seventh embodiment of an AC motor driver to which the present invention is applied. In FIG. 8, the same reference numerals as those in FIG. 3 designate the same components. FIG. 8 illustrates the configuration in which the control processing subsystems illustrated in FIG. 3 are implemented on digital processors, which process control signals in a digital form, such as a microcomputer or a digital processor.

In FIG. 8, blocks 19A, 19B indicate areas implemented by digital processors, respectively, wherein the block 19A represents a digital processor for controlling the A-system inverter 1A (hereinafter called the "A-system digital processor"), and the block 19B represents a digital processor for controlling the B-system inverter 1B (hereinafter called the "B-system digital processor"). The illustrated AC motor driver also comprises an A/D (analog-to-digital) converter 20A for analog-to-digital conversion of inputs to the A-system digital processor 19A; and an A/D converter 20B for analog-to-digital conversion of inputs to the B-system digital processor 19B. While FIG. 8 illustrates the configuration in which the A/D converters are incorporated in the associated digital processors, the same is applied to a configuration in which A/D converters are external to digital processors. It should be noted that while FIG. 8 illustrates the AC motor driver in the form of a single-phase connection diagram, the AC motor driver of the seventh embodiment actually supports control processing subsystems which handle three-phase or two-phase signals as illustrated in FIG. 3 (the number of slashes drawn on each line representative of a signal indicates the number of phases).

With the configuration based on the digital processors as illustrated in FIG. 8, it is possible to place the inverter 1A close to the digital processor 19A, and also place the inverter 1B close to the digital processor 19B. As a result, the distances between the inverters and PWM controllers (the distance between the inverter 1A and the PWM controller 11A, and the distance between the inverter 1B and the PWM controller 11B in FIG. 8) can be reduced, thereby making it possible to prevent noise from introducing into gate signals transmitted from the PWM controllers to gate circuits of the inverters and to prevent the gate signals from degrading. Since the gate signal directly corresponds to ON and OFF of each of phase switches in the respective inverters, blunted pulses (slowly rising and falling pulses) resulting from noise introducing into the signal or long distance transmission would cause grave problems such as malfunctions, delayed operation and so on of the inverters. It is therefore desired that the transmission distance between a PWM controller and an associated inverter be as short as possible.

In the configuration of FIG. 8, the A-system and B-system inverters can be placed in close proximity to the associated digital processors because two digital processors are used such that one is dedicated to the A-system control processing subsystem and the other to the B-system control processing subsystem, and digital signals are transmitted between the A-system digital processor and the B-system digital processor. Since digital signals are transmitted between the A-system digital processor and the B-system digital processor, the signals are free from degradation due to noise introducing thereinto and long distance transmission, so that the transmission distance therebetween can be made longer, and consequently the inverters can be placed in close proximity to the associated digital processors. It should be noted herein that a transmission delay will occur in the digital signal transmission between the A-system and B-system digital processors. However, since the control scheme illustrated in FIG. 3 provides a simplified control processing configuration and a shorter control cycle, the amount of transmission delay, which is proportional to the control cycle, can also be reduced and therefore will not substantially affect the control.

Another advantage provided from the configuration of FIG. 8 is that even if one digital processor fails, the remaining digital processor can drive one inverter. Also, since the A-system digital processor and the B-system digital processor in FIG. 8 are identical in configuration, two digital processors of the same type can be mounted so that the manufacturing of the digital processors is facilitated. Consequently, the digital processors can be manufactured at a lower cost, and a high performance and low price motor driver can be provided. Further, the digital processors illustrated in the configuration of FIG. 8 can be readily implemented by general-purpose control microprocessors which have a built-in A/D converter and PWM controller, and therefore the control configuration can advantageously be implemented using low-price microprocessors.

As will be appreciated from the foregoing, in addition to the effects provided by the configuration of FIG. 3, the configuration illustrated in FIG. 8 allows the inverters to be placed in close proximity to the associated digital processors, thereby making it possible to reduce the distances between the respective inverters and the PWM controllers and prevent noise from introducing into the gate signal, which is transmitted from the PWM controller to the gate circuit of the inverter, to degrade the gate signal. Additionally, in case one digital processor fails, the remaining digital processor can drive the inverter, thereby making it possible to construct a motor driver which is robust against a failure. Furthermore, since the control processing subsystems can be implemented by digital processors of the same type, the digital processors can be manufactured at a lower cost, with the result that a low price motor driver can be provided.

It should be noted that the configuration in FIG. 8 may be applied to a motor driver using an interphase reactor as illustrated in FIG. 4; to a motor driver using a three-phase two-winding motor as illustrated in FIG. 5; and to a motor driver using a three-phase two-winding motor with a phase difference as illustrated in FIG. 6.

Figure 9:
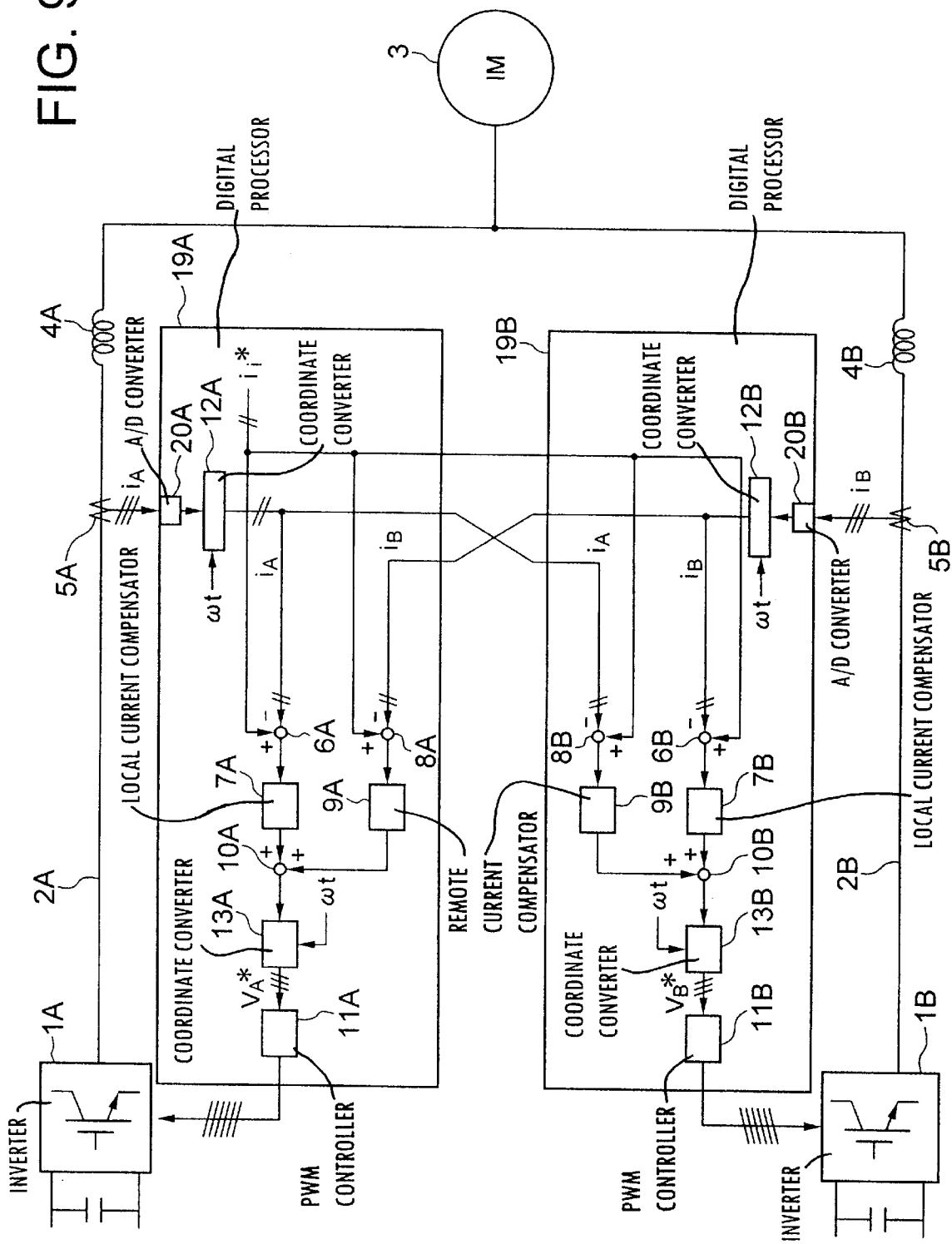
FIG. 9 is a diagram illustrating the configuration of a motor driver according to an eighth embodiment of the present invention.

FIG. 9 illustrates an eighth embodiment of an AC motor driver to which the present invention is applied. In FIG. 9, the same reference numerals as those in FIG. 8 designate the same components. The configuration in FIG. 9 differs from the configuration in FIG. 8 in that each of the A-system digital processor 19A and the B-system digital processor 19B comprises only one coordinate converter. For example, the A-system digital processor 19A comprises only one coordinate converter 12A, while the B-system digital processor 19B comprises only one coordinate converter 12B.

As a result, in each of the digital processor, the amount of operation involved in the coordinate conversion is reduced, and the control cycle can be further reduced, so that the control gain can be increased. Also, since the number of digital signals transmitted between the digital processors is reduced from that required for three phases to that required for two phase, the configuration of the driving system is simplified.

Figure 10:
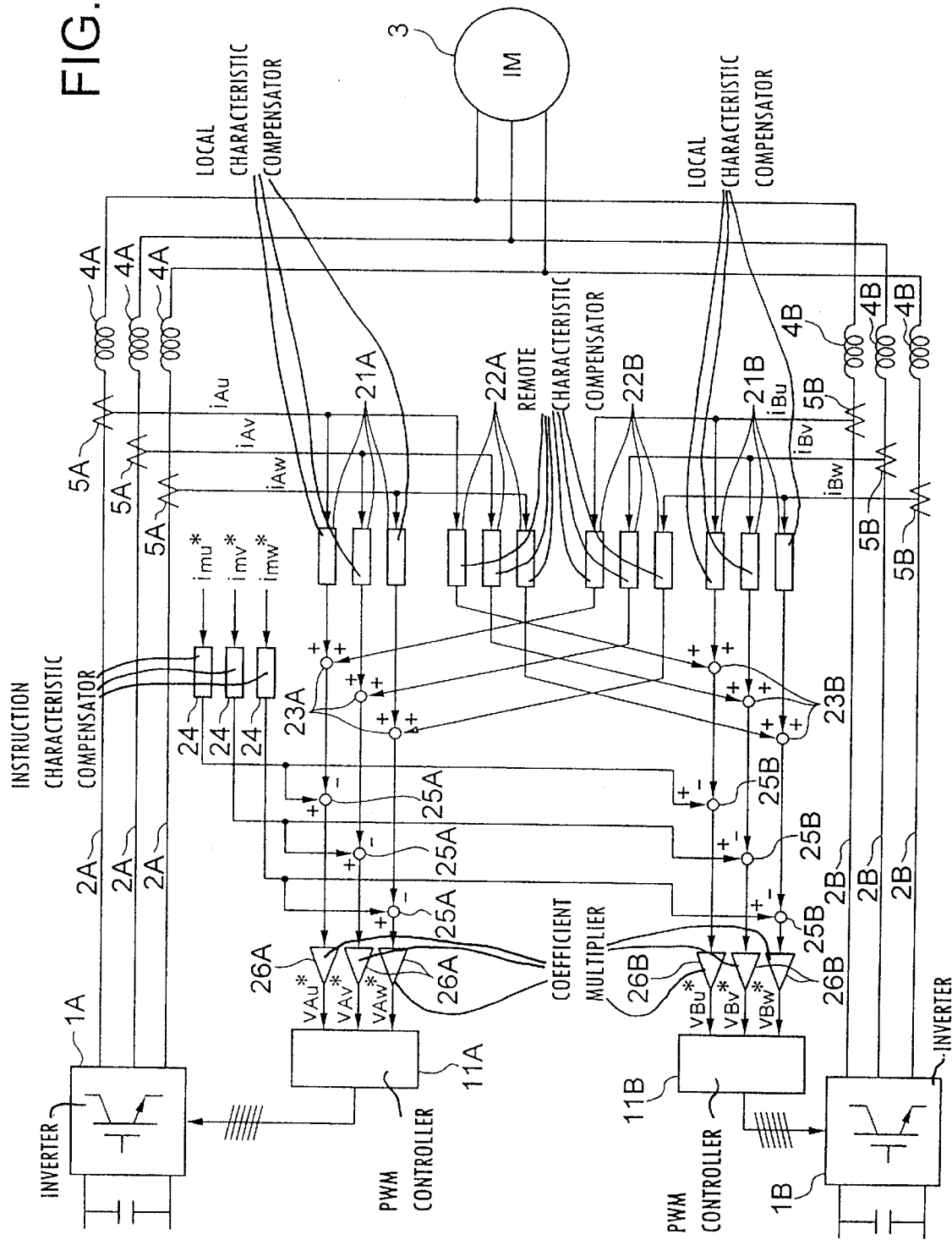
FIG. 10 is a diagram illustrating the configuration of a motor driver according to a ninth embodiment of the present invention.

FIG. 10 illustrates a ninth embodiment of an AC motor driver to which the present invention is applied. In FIG. 10, the same reference numerals as those in FIG. 1 designate the same components.

In FIG. 10, a control processing subsystem for the A-system inverter 1A comprises local characteristic compensators 21A for detected A-system current values $i_{AU}$, $i_{AV}$, $i_{AW}$; remote characteristic compensators 22B for detected B-system current values $i_{BU}$, $i_{BV}$, $i_{BW}$; adders 23A for adding outputs of the two characteristic compensators 21A, 23B; instruction characteristic compensators 24 for current instruction values $i_{mu}^*$, $i_{mv}^*$, $i_{mw}^*$ issued to a motor; subtractors 25A for subtracting outputs of the adders 23A from outputs of the characteristic compensators 24; coefficient multipliers 26A for multiplying outputs of the respective subtractors 25A by a predetermined coefficient; and a PWM controller 11A for converting outputs of the coefficient multipliers 26A to gate pulses. In this configuration, the local characteristic compensators 21A, remote characteristic compensators 22B and instruction characteristic compensators 24 act to process input signals with a predetermined transfer function such as a proportional function, a proportional-integral function or the like to compensate for the frequency characteristics of the gain and phase. The transfer function used herein may be a proportional element, a proportional-integral element, or the like. The control processing subsystem for the B-system inverter 1B is configured symmetric to the A-system control processing subsystem. The foregoing description may be applied to the B-system inverter 1B by replacing A with B and B with A in the respective reference numerals.

Taking the A-system control processing subsystem as an example, in a flow of processing, each control processing subsystem performs a predetermined characteristic compensations for each of detected current values of the A-system inverter and detected current values of the B-system inverter and adds the results of the compensation, while likewise performs a predetermined characteristic compensation for current instructions, and takes a deviation of each of the compensated instruction values from the associated sum of the compensated detected values. The deviation is multiplied by a predetermined coefficient to produce an inverter voltage instruction, based on which a PWM control is performed to output the gate pulses.

Next, a mathematical approach will be relied on to describe the fact that the control illustrated in FIGS. 12A, 12B can be realized as well through the foregoing processing flow. In the control system illustrated in FIG. 10, the transfer functions of the respective characteristic compensators 21 (21A, 21B), 22 (22A, 22B), 24, and a coefficient gain of the coefficient compensators 26 (26A, 26B) are set as follows.

A transfer function $G_1$ of the local characteristic compensators 21:

$$G_1 = K_m + K_C \tag{21}$$

A transfer function $G_2$ of the remote characteristic compensators 22:

$$G_2 = K_m - K_C \tag{22}$$

A transfer function $G_r$ of the instruction characteristic compensators 24:

$$G_r = \frac{G_1 + G_2}{2} = K_m \tag{23}$$

A coefficient gain K of the coefficient multipliers 26:

$$K = \frac{1}{2} \tag{24}$$

In this event, control operations performed in the A-system control processing subsystem and the B-system control processing subsystem are expressed by the following equations, respectively:

$$V_A^* = K\{G_r i_m^* - (G_1 i_A + G_2 i_B)\} \tag{25}$$

$$V_B^* = K\{G_r i_m^* - (G_1 i_B + G_2 i_A)\} \tag{26}$$

From the equations (25), (26), the following equations corresponding to the control illustrated in FIGS. 12A, 12B is derived:

$$\begin{aligned} V_m^* &= V_A^* + V_B^* \\ &= K[2 G_r i_m^* - \{(G_1 + G_2)(i_A + i_B)\}] \\ &= K_m \{i_m^* - (i_A + i_B)\} \\ &= K_m (i_m^* - i_m) \end{aligned} \tag{27}$$

$$\begin{aligned} V_c^* &= V_A^* + V_B^* \\ &= K\{(G_1 + G_2)(i_A + i_B)\} \\ &= K_c\{0 - (i_A + i_B)\} \\ &= K_c(0 - i_c) \end{aligned} \tag{28}$$

The equation (27) represents the control for the motor current circuit illustrated in FIG. 12A, while the equation (28) represents the control for the cross current circuit illustrated in FIG. 12B.

In this way, the control processing subsystems illustrated in FIG. 10 can equivalently carry out the control illustrated in FIGS. 12A, 12B when the transfer functions of the respective characteristic compensators and the coefficient gain of the coefficient multipliers are set to satisfy the equations (21), (22), (23), (24). It is therefore possible to simultaneously realize three effects: a reduction in the inductance valve in reactor constants, an appropriate control for the motor current, and suppression of the cross currents, as is the case of the control processing subsystems illustrated in FIG. 1.

Further advantageously, the control processing subsystems illustrated in FIG. 10 can be implemented in a more simple processing configuration than the control processing subsystems illustrated in FIG. 1. Therefore, as compared with the control processing subsystems illustrated in FIG. 1, the counterparts illustrated in FIG. 10 can reduce a processing time and a time delay, when the control processing subsystems are implemented by a microcomputer or a digital processor, thus leading to an increased stability margin and a higher control gain of the control system. This results in further improvements in the instruction responsibility and disturbance suppression characteristics of the control system.

Figure 11:
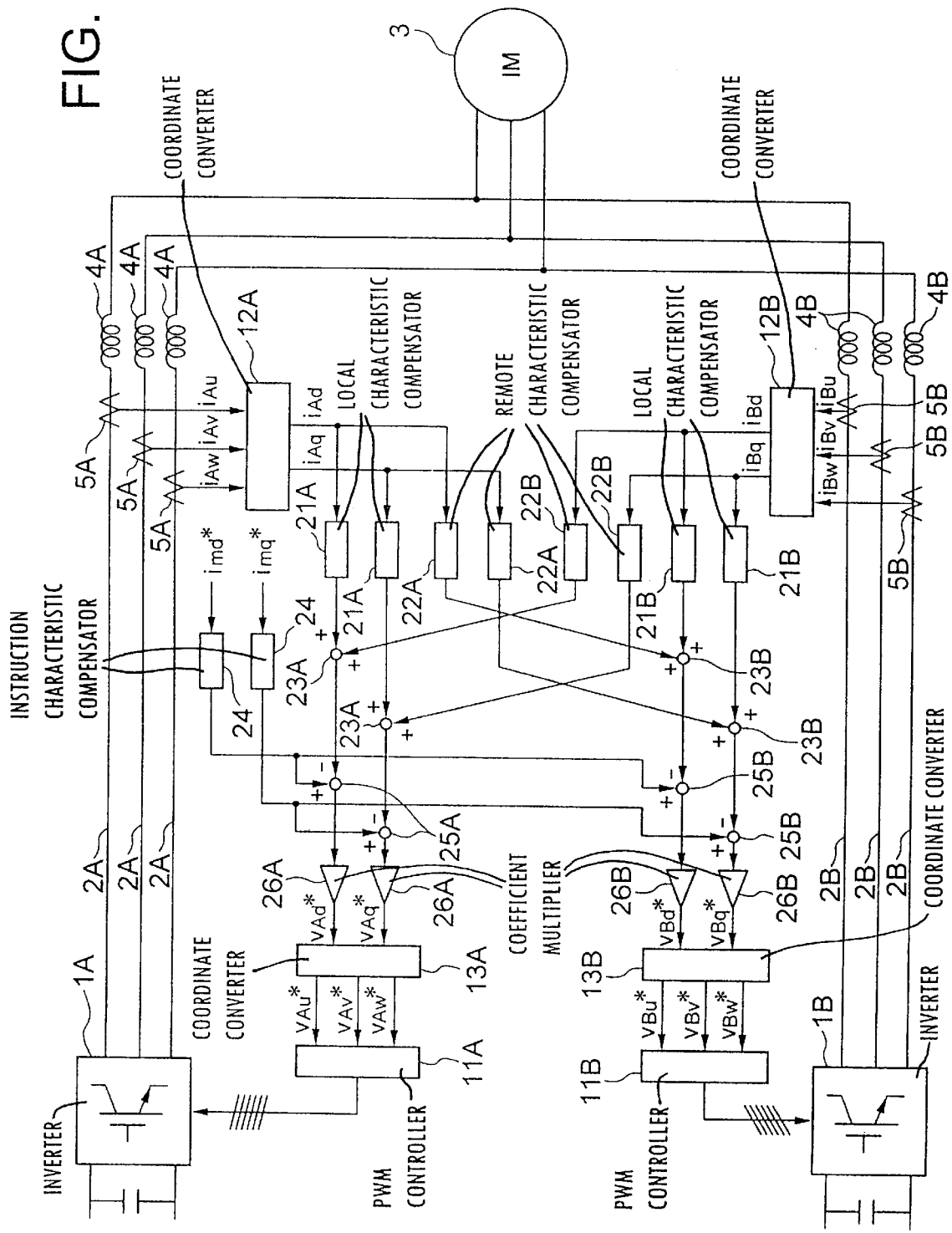
FIG. 11 is a diagram illustrating the configuration of a motor driver according to a tenth embodiment of the present invention.

FIG. 11 illustrates a tenth embodiment of an AC motor driver to which the present invention is applied. In FIG. 11, the same reference numerals as those in FIG. 10 designate the same components. The configuration in FIG. 11 differs from the configuration in FIG. 10 in that the former is additionally provided with a coordinate converter 12A for detected output current values of the A-system inverter 1A; a coordinate converter 12B for detected output current values of the B-system inverter 1B; a coordinate converter 13A for voltage instructions of the A-system inverter 1A; and a coordinate converter 13B for voltage instructions of the B-system inverter 1B. Since the operations of the coordinate converters 12A, 12B, 13A, 13B are identical to those described in FIG. 3, repetitive description thereon is omitted.

The control processing subsystems illustrated in FIG. 11 has the same effects as the previously described control processing subsystems illustrated in FIG. 3 over the control processing subsystems illustrated in FIG. 1. Specifically, the actions of the coordinate converters 12A, 12B convert basic wave components of the inverter output currents to direct current signals, so that a steady-state deviation in the instruction response can be eliminated. As a result, a more accurate control can be realized for both motor currents and cross currents, thus leading to an improved efficiency as an AC motor driver.

It should be noted that the present invention is not limited to inverters for driving a motor, but may be applied to a set of converters in a parallel configuration connected to an AC system for converting AC power to DC power, a set of parallel inverters coupled to a power system such as an active filter and a reactive power compensator, and so on. In essence, the present invention can be applied to any power converter for controlling an output current in response to a current instruction signal.

As described above, according to the present invention, when a plurality of inverters are operated in sets in parallel configuration to drive one motor, a control processing subsystem associated with each of the inverters is comprised of a plurality of parallel current compensators divided into local compensators and remote compensators. With this configuration, it is possible to independently carry out the suppression of cross currents, which flow between the inverters through electric coupling or magnetic coupling, and an appropriate control for motor currents. Additionally, since the control configuration is simple as compared with the prior art control configuration having similar effects, assuming that the control processing subsystems are implemented by a microcomputer or a digital processor, a processing time can be reduced, thus leading to a reduction in a useless time delay, an increase in stability margin of the control system, and an increase in the compensation gains of the compensators as compared with the prior art. This results in improved instruction response characteristics and disturbance suppression characteristics of the control system. Taking an example of an AC motor driving system for an elevator, torque ripple generated in a motor can be further suppressed to improve the riding quality of the elevator.

Moreover, the control processing subsystem associated with each inverter is comprised of a plurality of parallel current compensators divided into local compensators and remote compensators, so that if the inverter in one system fails, the control processing subsystem can be readily switched to an individual operation mode in which the remaining system is only operated, by stopping the failed inverter and simultaneously stopping the outputs of current compensators associated with the failed inverter. As a result, it is possible to promptly limit the influence due to the failed inverter in the one system and accordingly realize a system which is immune to a failure.

Also, in the embodiments which additionally comprise the coordinate conversion means for detected current values, the steady-state deviation for an instruction response can be eliminated, so that a highly accurate control can be realized for both motor currents and cross currents.

Further, in the embodiments which additionally comprise the coordinate conversion means with a phase correction function for detected current values, detected current values of respective inverters having different phases from one another can be handled likewise as signals at the same phase in the control processing subsystems when the present invention is applied to a three-phase two-winding motor having windings wound with a phase difference. As a result, the control processing subsystem associated with each inverter can be similarly comprised of a plurality of parallel current compensators divided into local compensators and remote compensators, when the present invention is applied to the three-phase two-winding motor having windings wound with a phase difference. In addition to the above effects, the torque ripple can be reduced by the action of the three-phase two-winding motor having windings wound with a phase difference. For example, in a motor driver for an elevator, this effect corresponds to the effect of eliminating vibrations during the running to improve the riding quality of the elevator. It should be noted that the coordinate conversion means with a phase correction function is a widely applicable effective means whenever a three-phase two-winding motor having windings wound with a phase difference is employed, other than the control processing subsystems described in the present invention.

Also, in the embodiments which employ two digital processors for implementing the control processing subsystems such that one of the digital processors is dedicated to the A-system control processing subsystem and the other one is dedicated to the B-system control processing subsystem with a digital signal transmitted between the A-system digital processor and the B-system digital processor, the A-system and B-system inverters can be placed in close proximity to the digital processors associated therewith. As a result, in addition to the above effects, the distance between each inverter and an associated PWM controller can be reduced, it is possible to prevent noise from introducing into a gate signal, which is transmitted from the PWM controller to the gate circuit of the inverter, to degrade the gate signal. Moreover, in case one of the digital processors fails, the remaining digital processor can drive the associated inverter, thereby making it possible to construct a motor driver which is robust against a failure. Additionally, since the digital processors of the same type can be used, the digital processors can be manufactured at a lower cost, thereby making it possible to provide a low-price motor driver.

In addition to the effects provided by the configuration of FIG. 3, the configuration illustrated in FIG. 8 allows each inverter to be placed in close proximity to an associated digital processor, so that the distance between the inverter and an associated PWM controller can be reduced. It is therefore possible to prevent noise from introducing into a gate signal, which is transmitted from the PWM controller to the gate circuit of the inverter, to degrade the gate signal. Moreover, in case one of the digital processors fails, the remaining digital processor can drive the associated inverter, thereby making it possible to construct a motor driver which is robust against a failure. Additionally, since the digital processors of the same type can be used, the digital processors can be manufactured at a lower cost, thereby making it possible to provide a low-price motor driver.

What is claimed is:

1. A driving system for driving an AC motor, comprising a plurality of power converters for supplying AC output power of each said power converter to said AC motor, wherein a control instruction for each of said power converters is generated by summing outputs of a plurality of current compensation means connected in parallel, and each of said plurality of current compensation means makes compensation to reduce a deviation of a detected output current of said each power converter from a current instruction value to be outputted from said each power converter to zero.

2. A driving system for driving an AC motor according to claim 1, wherein:
   said current instruction value is set to a quotient calculated by dividing a current value to be supplied to said AC motor by the number of said power converters.

3. A driving system for driving an AC motor according to claim 1 or 2, wherein:
   compensation gains of said plurality of current compensation means connected in parallel act such that sums of the respective compensation gains control currents of said motor, and differences of the respective compensation gains control cross currents between said plurality of power converters.

4. A driving system for driving an AC motor according to claim 1 or 2, wherein:
   said plurality of current compensation means connected in parallel include current compensation means for compensating for a current of a power converter operative to output a control instruction, said current compensation means having a compensation gain set to a value proportional to a sum of a control gain required for controlling a motor current and a control gain required for controlling the cross currents between said plurality of power converters, and said plurality of current compensation means further include remaining current compensation means having a compensation gain set to a value proportional to a difference between the control gain required for controlling a motor current and the control gain required for controlling the cross currents between said plurality of power converters.

5. A driving system for driving an AC motor according to claim 1 or 2, wherein:
   said plurality of current compensation means connected in parallel include current compensation means for compensating for a current of a power converter operative to output a control instruction, said current compensation means having a compensation gain set to a value larger than a compensation gain of remaining current compensation means.

6. A driving system for driving an AC motor comprising:
   a three-phase multiple-winding AC motor having windings wound with a predetermined phase difference with respect to an in-phase winding;
   a plurality of power converters connected to said three-phase multiple-winding AC motor, each of said power converters outputting an AC current having a predetermined phase difference; and
   rotating coordinate conversion means for providing a predetermined phase difference to correct a detected output current value of said each power converter for a phase difference thereof.

7. A driving system for driving an AC motor comprising:
   a plurality of power converters, each of said power converters outputting AC output power to said AC motor;
   a plurality of detected current compensation means for processing compensation elements having different characteristics from one another for respective detected output current values of said respective power converters;
   current instruction compensation means for processing a compensation element to a desired motor current instruction;
   means for taking a deviation of an output of said detected current compensation means from an output of said current instruction compensation means; and
   means for multiplying said deviation by a predetermined gain to output a control instruction to each of said power converters.

8. A driving system, comprising:
   a plurality of power converters; and
   a plurality of controllers for controlling the plurality of power converters;
   wherein each of said controllers controls one of the power converters based on a difference between an output current of another one of the power converters and a current instruction value for the output current of the other one of the power converters so as to reduce the difference to zero.

9. A driving system comprising:
   a first power converter;
   a second power converter;
   a first controller for controlling the first power converter such that an output current of the first power converter and an output current of the second power converter match current instruction values; and
   a second controller for controlling the second power converter such that the output current of the second power converter matches the current instruction values;
   wherein a system including the second power converter and the second controller is independent in terms of control with respect to a system including the first power converter and the first controller.

* * * * *